United States Patent
Li et al.

(10) Patent No.: US 7,408,908 B2
(45) Date of Patent: Aug. 5, 2008

(54) VARIABLE SDMA ACK TIMEOUT

(75) Inventors: Qinghua Li, Sunnyvale, CA (US); Xintian E. Lin, Palo Alto, CA (US); Minnie Ho, Los Altos, CA (US); Adrian P. Stephens, Cambridge (GB)

(73) Assignee: Intel Corporation, Santa Clara, CA (US)

( * ) Notice: Subject to any disclaimer, the term of this patent is extended or adjusted under 35 U.S.C. 154(b) by 835 days.

(21) Appl. No.: 10/759,473

(22) Filed: Jan. 15, 2004

(65) Prior Publication Data

US 2005/0157734 A1    Jul. 21, 2005

Related U.S. Application Data

(60) Provisional application No. 60/493,937, filed on Aug. 8, 2003.

(51) Int. Cl.
 *H04Q 7/24* (2006.01)

(52) U.S. Cl. .................. 370/338; 370/400; 370/445; 370/447; 370/462

(58) Field of Classification Search .................. None
See application file for complete search history.

(56) References Cited

U.S. PATENT DOCUMENTS

| | | | | |
|---|---|---|---|---|
| 5,339,316 A | * | 8/1994 | Diepstraten | 370/401 |
| 5,528,605 A | * | 6/1996 | Ywoskus et al. | 714/749 |
| 6,459,704 B1 | * | 10/2002 | Jandrell | 370/445 |
| 6,765,870 B2 | * | 7/2004 | Chintada et al. | 370/230 |
| 2003/0140296 A1 | * | 7/2003 | Odman | 714/749 |

FOREIGN PATENT DOCUMENTS

EP    1263168    12/2002

OTHER PUBLICATIONS

PCT/US2004/025569—Dec. 27, 2004—International Search Report and Written Opinion
Sakr C et al—Oct. 28, 1997—Carrier-Sense Protocols for Packet-Switched Smart Antenna Basestations—pp. 45-52.
Lal D et al—Jul 1, 2002—Throughput Enhancement in Wireless and Hoc Networks With Spatial Channels—A Mac Layer Perspective pp. 421-428.

\* cited by examiner

*Primary Examiner*—Wing F. Chan
*Assistant Examiner*—Brian Roberts
(74) *Attorney, Agent, or Firm*—John F. Travis

(57) ABSTRACT

In a spatial division multiple access system that employs acknowledgements to variable length transmissions within a timeout period, a station that has completed its transmission may delay beginning the timeout period until it determines that other stations on the same channel have completed their transmissions.

20 Claims, 4 Drawing Sheets

VARIABLE SDMA ACK TIMEOUT

The present application claims priority based on U.S. Provisional Application No. 60/493,937, entitled "HIGH-THROUGHPUT WIRELESS LAN SYSTEM APPARATUS AND ASSOCIATED METHODS" filed Aug. 8, 2003.

BACKGROUND

To address the problem of ever-increasing bandwidth requirements that are placed on wireless data communications systems, various techniques are being developed to allow multiple devices to communicate with a single base station by sharing a single channel. In one such technique, a base station may transmit or receive separate signals to or from multiple mobile devices at the same time on the same frequency, provided the mobile devices are located in sufficiently different directions from the base station. For transmission from the base station, different signals may be simultaneously transmitted from each of separate spaced-apart antennas so that the combined transmissions are directional, i.e., the signal intended for each mobile device may be relatively strong in the direction of that mobile device and relatively weak in other directions. In a similar manner, the base station may receive the combined signals from multiple independent mobile devices at the same time on the same frequency through each of separate spaced-apart antennas, and separate the combined received signals from the multiple antennas into the separate signals from each mobile device through appropriate signal processing so that the reception is directional.

Under currently developing specifications, such as IEEE 802.11 (IEEE is the acronym for the Institute of Electrical and Electronic Engineers, 3 Park Avenue, 17th floor, New York, N.Y.) each mobile device may transmit a data block of variable length, and then wait for a predetermined timeout period after the data block for an acknowledgment from the base station to signify that the base station received the data block. If the base station transmits and receives on the same frequency, that fact may preclude the base station from transmitting and receiving at the same time, so that the base station waits until all incoming data blocks are complete before sending out any acknowledgments. However, since the data blocks are of variable length, a mobile device sending a short data block may experience an acknowledgment timeout while the base station is still receiving a long data block from another mobile device. The resulting unnecessary retransmission of the short data block may cause inefficiencies in the overall data communications, and under some circumstances may even result in a service interruption.

BRIEF DESCRIPTION OF THE DRAWINGS

The invention may be understood by referring to the following description and accompanying drawings that are used to illustrate embodiments of the invention. In the drawings.

DETAILED DESCRIPTION OF THE INVENTION

Figure 1:
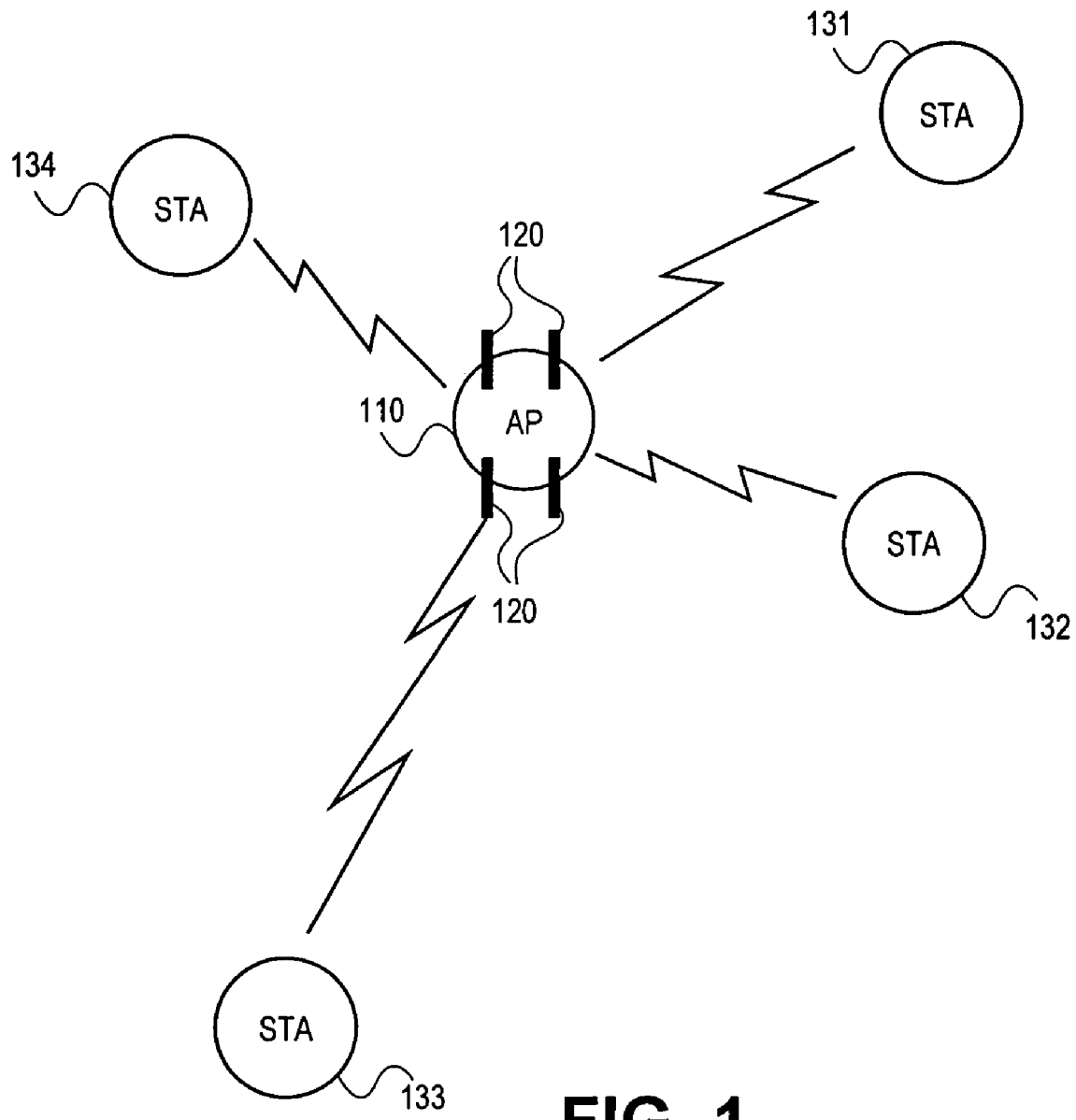
FIG. 1 shows a diagram of a communications network, according to an embodiment of the invention.

In the following description, numerous specific details are set forth. However, it is understood that embodiments of the invention may be practiced without these specific details. In other instances, well-known methods, structures and techniques have not been shown in detail in order not to obscure an understanding of this description.

References to "one embodiment", "an embodiment", "example embodiment", "various embodiments", etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are either in direct physical or electrical contact, or that two or more elements are not in direct contact with each other but yet still co-operate or interact with each other.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Unless specifically stated otherwise, as apparent from the following discussions, it is appreciated that throughout the specification discussions utilizing terms such as "processing," "computing," "calculating," or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data from registers and/or memory to transform that electronic data into other electronic data that may be stored in registers and/or memory. A "computing platform" may comprise one or more processors.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not.

In keeping with common industry terminology, the terms "base station", "access point", and "AP" may be used interchangeably herein to describe an electronic device that may communicate wirelessly and substantially simultaneously with multiple other electronic devices, while the terms "mobile device" and "STA" may be used interchangeably to describe any of those multiple other electronic devices, which may have the capability to be moved and still communicate, though movement is not a requirement. However, the scope of the invention is not limited to devices that are labeled with those terms. Similarly, the terms "spatial division multiple access" and SDMA may be used interchangeably. As used herein, these terms are intended to encompass any communication technique in which different signals may be transmitted by different antennas substantially simultaneously from the same device such that the combined transmitted signals result in different signals intended for different devices being transmitted substantially in different directions on the same frequency, and/or techniques in which different signals may be received substantially simultaneously through multiple antennas on the same frequency from different devices in different directions and the different signals may be separated from each other through suitable processing. The term "same frequency", as used herein, may include slight variations in the exact frequency due to such things as bandwidth tolerance, Doppler shift adaptations, parameter drift, etc. Two or more transmissions to different devices are considered substantially simultaneous if at least a portion of each transmission to the different devices occurs at the same time, but does not imply that the different transmissions must start and/or end at the same time, although they may. Similarly, two or more receptions from different devices are considered substantially simultaneous if at least a portion of each reception from the different devices occurs at the same time, but does not imply that the different transmissions must start and/or end at the same time, although they may. Variations of the words represented by the term SDMA may sometimes be used by others, such as but not limited to substituting "space" for "spatial", or "diversity" for "division". The scope of various embodiments of the invention is intended to encompass such differences in nomenclature.

Various embodiments of the invention may use a sliding timeout period by a STA to accommodate a situation in which transmissions from one or more other STAs may be longer than the transmission from the STA initiating the timeout period. This sliding timeout period may prevent an inadvertent timeout in the STA by waiting until the AP has finished receiving transmissions from the STAs before beginning the timeout period, rather than beginning the timeout period while other STAs may still be transmitting to the AP.

FIG. 1 shows a diagram of a communications network, according to an embodiment of the invention. The illustrated embodiment of an SDMA-based network shows an AP 110 that may communicate with multiple STAs 131-134 located in different directions from the AP in the manner described herein. Although AP 110 is shown with four antennas 120 to simultaneously communicate with up to four STAs at a time, other embodiments may have other arrangements (e.g., AP 110 may have two, three, or more than four antennas). Each STA may have one or more antennas to communicate with the AP 110. In some embodiments the one or more STA antennas may be adapted to operate as omnidirectional antennas, but in other embodiments the one or more STA antennas may be adapted to operate as directional antennas. In some embodiments the STAs may be in fixed locations, but in other embodiments at least some of the STAs may be moved during and/or between communications sequences. In some embodiments the AP 110 may be in a fixed location, but in other embodiments the AP 110 may be mobile.

Figure 2:
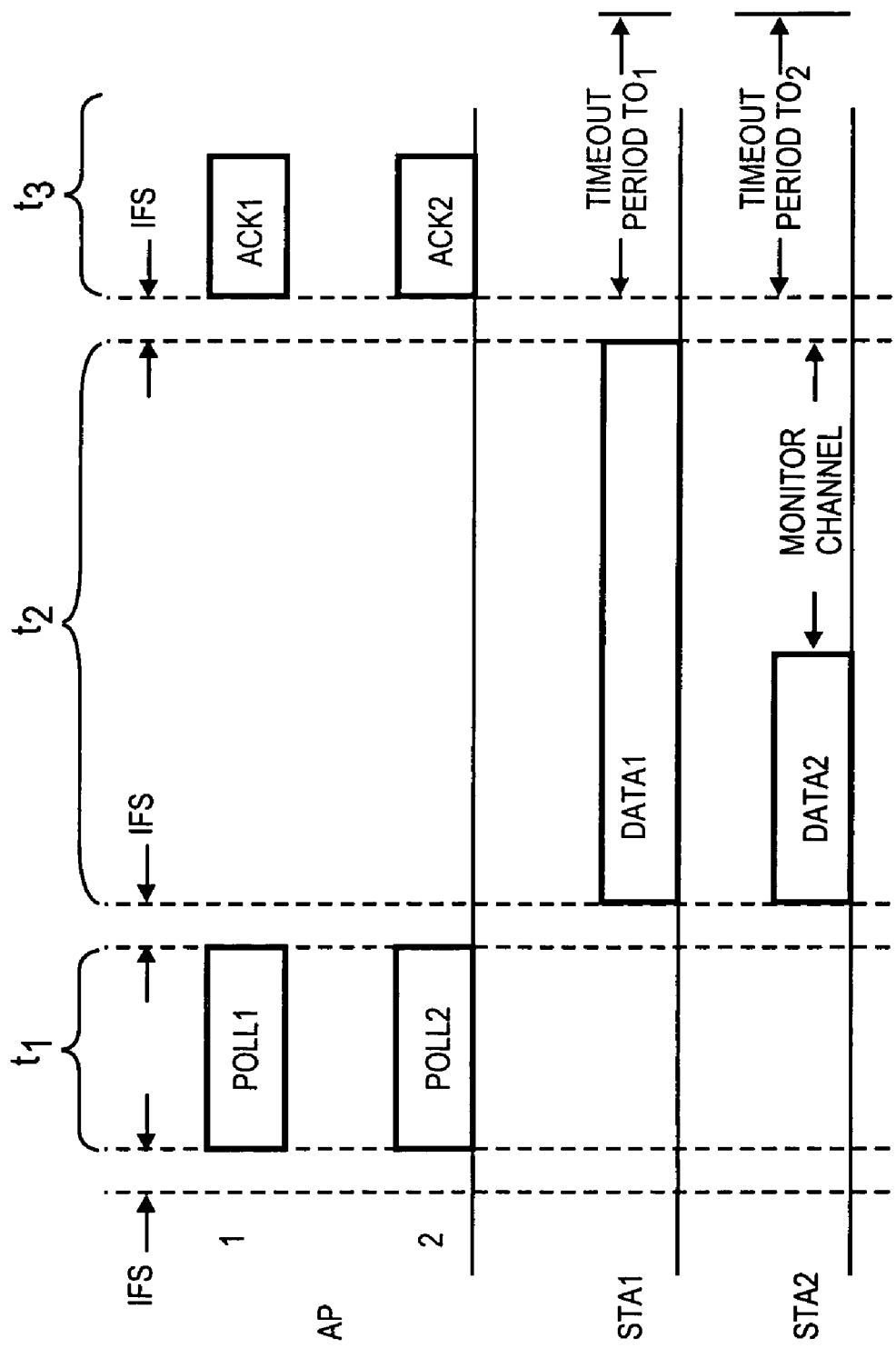
FIG. 2 shows a timing diagram of a communications sequence involving a base station and multiple mobile devices, according to an embodiment of the invention.

FIG. 2 shows a timing diagram of a communications sequence involving an AP and two STAs (labeled STA1 and STA2), according to an embodiment of the invention. Although the illustrated embodiment shows two STAs, other embodiments may comprise other quantities of STAs. In the AP section of FIG. 2, the line labeled 1 may indicate directional transmissions from the AP to STA1, while the line labeled 2 may indicate directional transmissions from the AP to STA2. The lines STA1 and STA2 may indicate transmissions from STA1 to the AP and from STA2 to the AP, respectively. In some embodiments, transmissions from STA1 and STA2 are omnidirectional (e.g., substantially in a 360 degree circle around the transmitting STA), although in other embodiments the transmissions from STA1 and STA2 may be directional.

Communications between the AP and the STAs may include other communications sequences not shown in FIG. 2, e.g., communications that occur before and/or after the sequences shown. Such sequences may include, but are not limited to, such things as polls, data, acknowledgements, etc.

In FIG. 2, it may be assumed that the AP has already established whatever parameters may be needed to directionally transmit different data to multiple STAs substantially simultaneously using SDMA techniques, and to receive different data from multiple STAs substantially simultaneously. Using this capability, the AP may transmit to both STA1 and STA2 during polling time period $t_1$. In the embodiment shown, the AP transmits a poll (POL1) to STA1, requesting a response to the POLL1 from STA1, and the AP transmits a poll (POLL2) to STA2, substantially simultaneously with POLL1, requesting a response to the POLL2 from STA2. During the polling time period $t_1$, any of the poll transmissions may include information other than the poll, e.g, data, administrative information, etc.

During time period $t_2$, STA1 and STA2 may transmit responses to the AP substantially simultaneously. In the illustrated embodiment, these responses each include data transmitted to the AP in response to the poll from the AP, but other embodiments may produce other types of responses, e.g., administrative information, a request for a particular type of acknowledgment, etc.

During time period $t_3$, after all STAs have finished transmitting, the AP may individually acknowledge these responses substantially simultaneously, as shown. ACK1 is shown as an acknowledgement to the response from STA1, while ACK2 is shown as an acknowledgement to the response from STA2. If a given STA does not receive an acknowledgement within a pre-defined timeout period, it may assume the response was not correctly received by the AP and may retransmit the response when polled again.

The control of timeout periods, whether in the AP or a STA, may be implemented in any feasible manner, e.g., a hardware counter, a software counter, etc.

In the operation shown in FIG. 2, the response from STA2 is significantly shorter than the response from STA1. If STA2 begins a timeout period immediately after completing its response, the timeout period may expire before the AP can send an acknowledgement during $t_3$, and may even expire while STA1 is still transmitting, thereby possibly creating a need for a retransmission from STA2. To avoid this condition, STA2 may monitor the channel immediately after completing its response to see if the channel is busy, and not permit a timeout period to be initiated if any STAs are still transmitting.

In some embodiments, after each STA completes its response, it monitors the channel for a clear channel condition (i.e., no STAs are perceived to be transmitting on the channel). In the illustrated example of FIG. 2, STA2 may begin monitoring the channel immediately after completion of the DATA2 response, and detect that another STA is still transmitting on the channel. In the illustrated example, STA1 is still transmitting, but in the general case STA2 may not know the identity of the transmitting STA, only that at least one STA is still transmitting.

Once STA1 stops transmitting, it may also begin monitoring for a clear channel condition immediately after completion of the DATA1 response. In the illustrated example, no other STAs are transmitting at that time, so the channel may be determined immediately to be clear.

In some embodiments, detection of a clear channel condition may be accomplished by monitoring for the transmission of information (e.g., data, administrative information, etc.) on the channel, but other embodiments may use other techniques (e.g., monitoring for a carrier signal, etc.). Once a clear channel condition is detected, the response time period $t_2$ may end, and the subsequent acknowledgment time period $t_3$ may begin. In the illustrated embodiments, an interframe space (IFS) is shown between the various time periods $t_1$, $t_2$, and $t_3$, although the scope of the invention is not limited in this respect. An IFS may provide a short time period to allow for things such as, but not limited to: 1) time to allow for tolerances in the timing of different devices, 2) time to perform processing necessary before beginning the next time period, 3) time to allow a device to switch between transmit and receive modes, 4) etc. In some embodiments, all IFS's have the same duration, but in other embodiments the duration of a particular IFS may depend on where it occurs in the overall sequence. In the example shown, when the response time period ends after completion of the longest response, an IFS time period may be experienced before the STAs begin their acknowledgment timeout periods, although the scope of various embodiments of the invention are not limited in this manner.

In the example of FIG. 2, timeout period $TO_1$ is the timeout period for STA1, and timeout period $TO_2$ is the timeout period for STA2. Each of these timeout period may be controlled within the respective STA through any feasible means. If the STA does not receive its expected acknowledgment from the AP within the timeout period, the STA may assume that its response was not correctly received by the AP, and may then make arrangements to retransmit the response after another poll from the AP. Alternately, the STA may retransmit the response by gaining access to the channel without requiring a poll, although the scope of the invention is not limited in this regard.

Figure 3:
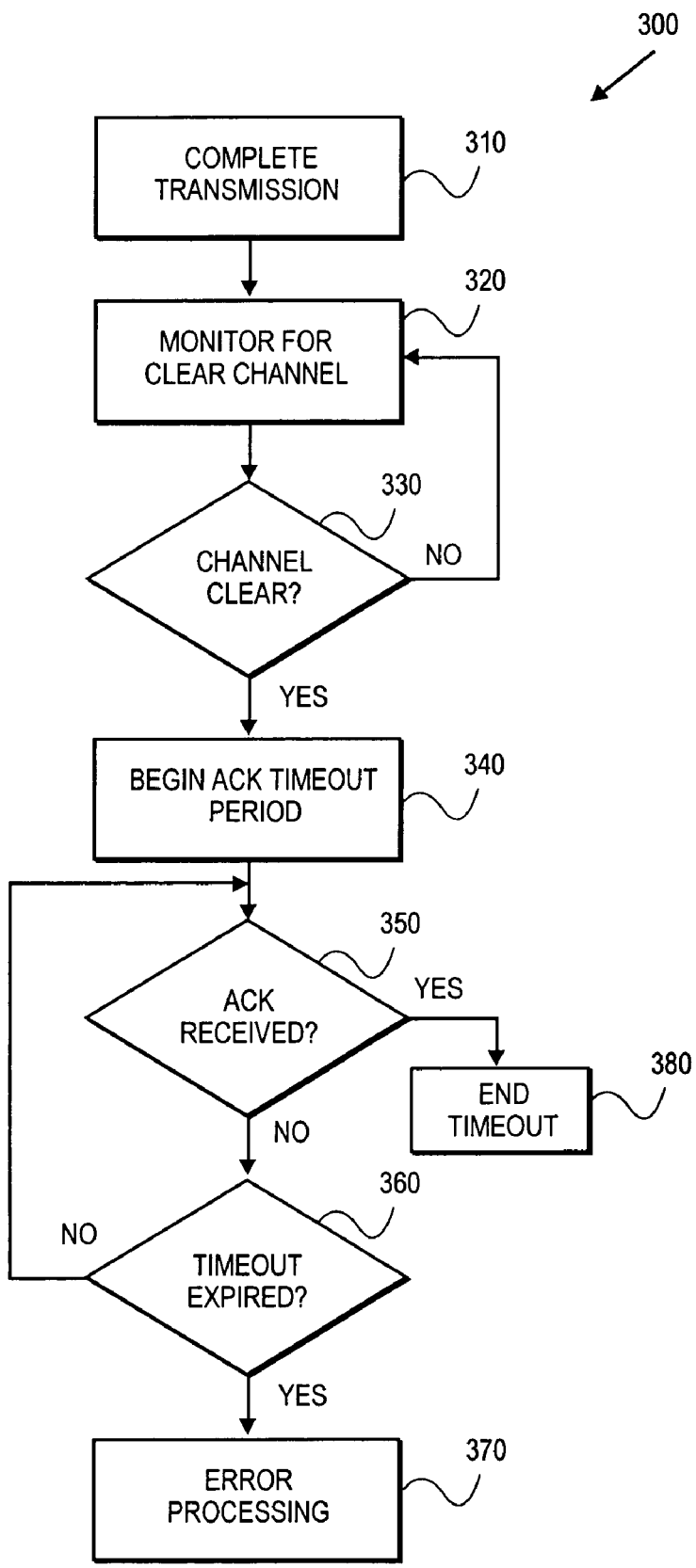
FIG. 3 shows a flow chart of a method of using channel clear detection, according to an embodiment of the invention.

FIG. 3 shows a flow chart of a method of using channel clear detection, according to an embodiment of the invention. As shown in flow chart 300, at 310 a transmission is completed by a STA. For example, this may correspond to the end of the 'DATA2' response in FIG. 2. At 320 the STA may then monitor the channel for any ongoing transmissions by other STAs. The absence of such ongoing transmission is indicated as a 'clear channel' condition in the figures, although the scope of the invention is not limited by the use of this terminology. When other STAs are no longer transmitting, as determined at 330, an acknowledgment timeout period may begin at 340. The loop formed at 350 and 360 may determine whether the timeout period expires before an ACK is received. If the ACK is received first at 350, the timeout period may be ended (e.g., cancelled or aborted) at 380, and other processing (not shown) begun. If the ACK timeout period expires at 360 before an ACK is received, the process may revert to error processing at 370. Error processing may include various operations, such as preparing to retransmit the information that was not acknowledged, in response to a future poll. Depending on the frequency with which the channel is monitored, and/or the time the STA takes to recognize that a clear channel is actually clear, it is possible that an ACK may be received before the channel is determined to be clear at 330, in which case the flow may jump directly to 350/380.

Various embodiments of the invention may be implemented in one or a combination of hardware, firmware, and software. Embodiments of the invention may also be implemented as instructions stored on a machine-readable medium, which may be read and executed by a computing platform to perform the operations described herein, for example those operations described in FIG. 3 and the associated text, and any necessary supporting operations such as, but not limited to, placing data into at least one transmit queue for transmission and reading received data from at least one receive queue. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; and others.

Figure 4:
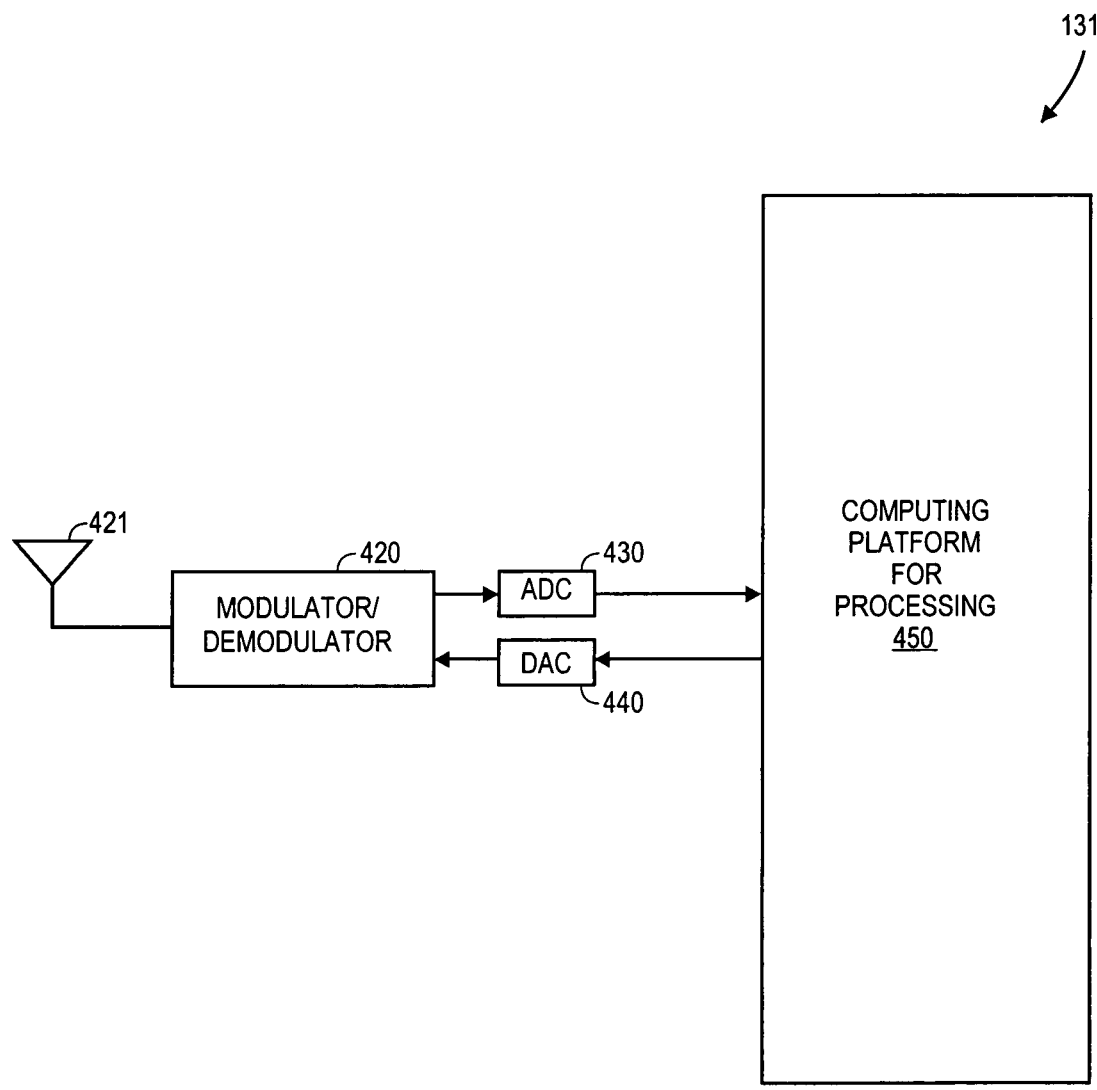
FIG. 4 shows a block diagram of a mobile device, according to an embodiment of the invention.

FIG. 4 shows a block diagram of a mobile device, according to an embodiment of the invention. Computing platform 450 may include one or more processors, and at least one of the one or more processors may be a digital signal processor (DSP), although various embodiments of the invention are not limited in this manner. The combination of demodulator-ADC may convert received radio frequency signals from the antenna into digital signals suitable for processing by the computing platform 450. Similarly, the combination of DAC-modulator may convert digital signals from the computing platform 450 into radio frequency signals suitable for transmission through the antenna. In the illustrated embodiment, STA 131 has one each of antenna 421, modulator/demodulator 420, ADC 430 and DAC 440, but other embodiments may have multiple antennas and/or may have more than one modulator/demodulator 420, ADC 430 and/or DAC 440 coupled between each antenna and the computing platform 450. Other components not shown may be included as needed (either within or external to the illustrated components), such as but not limited to amplifiers, filters, oscillators, etc.

The foregoing description is intended to be illustrative and not limiting. Variations may occur to those of skill in the art. Those variations are intended to be included in the various embodiments of the invention, which are limited only by the spirit and scope of the appended claims.

What is claimed is:

1. An apparatus, comprising
a device containing a computing platform, a modulator and a demodulator to process radio frequency signals, the device to:
perform a transmission to a base station over a wireless channel;
monitor the wireless channel, subsequent to completion of the transmission, to determine if another device is transmitting to the base station over the wireless channel; and
begin a timeout period responsive to determining said another device is not transmitting to the base station over the wireless channel, the timeout period to measure a time during which an acknowledgement from the base station may be received.

2. The apparatus of claim 1, wherein the device is further adapted to not begin the timeout period responsive to determining said another device is transmitting to the base station over the wireless channel.

3. The apparatus of claim 1, wherein the device is further adapted to monitor for an acknowledgement, from the base station, to the completed transmission during the timeout period.

4. The apparatus of claim 3, wherein the device is further adapted to cancel the timeout period responsive to receiving the acknowledgement prior to an end of the timeout period.

5. The apparatus of claim 3, wherein the device is further adapted to retransmit the transmission responsive to not receiving the acknowledgement prior to the end of the timeout period.

6. The apparatus of claim 1, wherein said monitoring comprises monitoring for a carrier wave.

7. The apparatus of claim 1, wherein said monitoring comprises monitoring for transmission of data.

8. A system, comprising:
an omnidirectional antenna;
a wireless communications device containing a computing platform, a modulator and a demodulator to process radio frequency signals, the device coupled to the omnidirectional antenna and adapted to
perform a transmission from the omnidirectional antenna to a base station over a wireless channel;
monitor the wireless channel, subsequent to completion of the transmission, for a clear channel condition; and
begin a timeout period responsive to determining a presence of the clear channel condition.

9. The system of claim 8, wherein the device is further adapted to not begin the timeout period responsive to determining an absence of the clear channel condition.

10. The system of claim 8, wherein the device is further adapted to cancel the timeout period responsive to receiving an acknowledgement prior to an end of the timeout period.

11. The system of claim 10, wherein the device is further adapted to begin an error process responsive to not receiving the acknowledgement prior to the end of the timeout period.

12. The system of claim 11, wherein the error process comprises preparing to retransmit the transmission over the wireless channel.

13. The system of claim 8, wherein said monitoring comprises monitoring for a carrier wave.

14. A method, comprising:
transmitting a data transmission to a base station over a wireless communications channel;
monitoring the wireless communications channel, subsequent to said transmitting, until a clear channel condition is detected;
beginning a timeout period subsequent to said detecting a clear channel condition; and
determining if an acknowledgement to said data transmission is received from the base station during the timeout period.

15. The method of claim 14, further comprising aborting said timeout period responsive to receiving the acknowledgement during the timeout period.

16. The method of claim 14, further comprising beginning an error process responsive to not receiving the acknowledgement prior to an expiration of the timeout period.

17. A computer-readable medium storing instructions, which when executed by a processing platform, cause said processing platform to perform operations comprising:
placing data into at least one transmit queue to perform a data transmission over a wireless communications channel;
monitoring the wireless communications channel subsequent to said data transmission;
beginning a timeout period responsive to said monitoring determining that said wireless communications channel is not busy; and
reading data from a receive queue to determine if an acknowledgement to said data transmission is received during the timeout period.

18. The medium of claim 17, wherein said operations further comprise aborting said timeout period responsive to said receiving the acknowledgement prior to an expiration of the timeout period.

19. The medium of claim 17, wherein said operations further comprise beginning an error process responsive to not receiving the acknowledgement prior to an expiration of the timeout period.

20. The medium of claim 17, said monitoring comprises monitoring for a clear channel condition.

* * * * *